United States Patent [19]

Douglas

[11] 4,212,524
[45] Jul. 15, 1980

[54] VARYING FRICTIONAL FORCES ON A FILM ADVANCING APPARATUS

[75] Inventor: Lawrence M. Douglas, South Easton, Mass.

[73] Assignee: Polaroid Corporation, Cambridge, Mass.

[21] Appl. No.: 17,055

[22] Filed: Mar. 2, 1979

[51] Int. Cl.² .................... G03B 17/52; G03B 1/08; G03B 1/32
[52] U.S. Cl. ............................ 354/86; 354/212
[58] Field of Search ............... 354/83, 86, 212, 84, 354/85, 87

[56] References Cited

U.S. PATENT DOCUMENTS

| | | | |
|---|---|---|---|
| 2,873,658 | 2/1959 | Land | 354/86 |
| 3,826,655 | 7/1974 | Borel et al. | 96/76 R |
| 3,967,304 | 6/1976 | Johnson et al. | 354/83 |
| 4,068,244 | 1/1978 | Douglas | 354/85 |
| 4,112,469 | 10/1978 | Kindig et al. | 354/83 |

*Primary Examiner*—L. T. Hix
*Assistant Examiner*—Shelley Wade
*Attorney, Agent, or Firm*—Alfred E. Corrigan

[57] ABSTRACT

Photographic apparatus including an elongate member mounted for reciprocating movement between first and second positions for advancing an exposed film unit of the self-developing type between a pair of pressure-applying rollers. Initially, there is a loose fit between the elongate member and its mounting. As the elongate member is moved out of the first position it is canted thereby substantially increasing the sliding frictional forces between it and its mounting thus accurately locating a film unit engaging member in alignment with a trailing edge of an exposed film unit prior to moving it into engagement with the rollers. When the elongate member reaches the second position, the sliding frictional forces are substantially reduced thereby enabling a relatively weak spring to return the elongate member to the first position. Structure is provided for preventing movement of the elongate member back to the first position until it has reached the second position.

5 Claims, 8 Drawing Figures

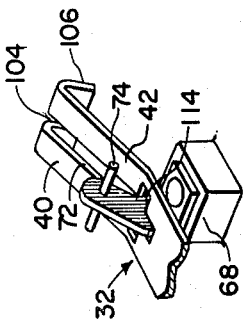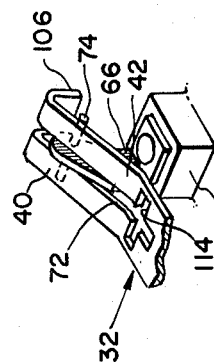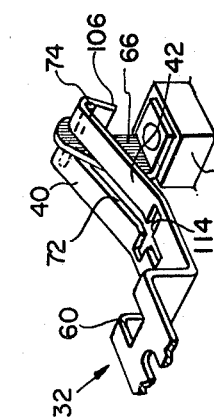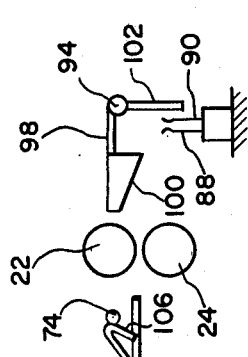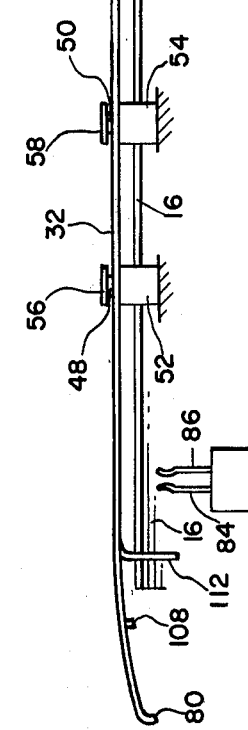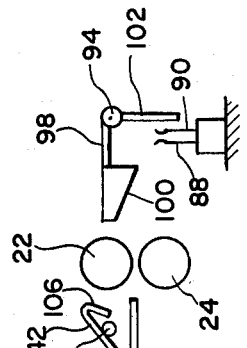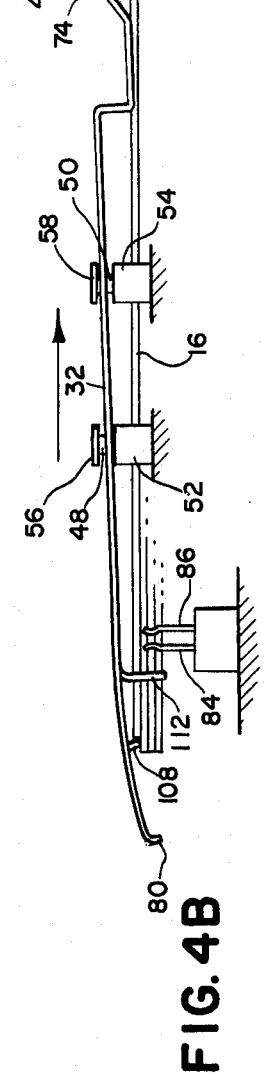

VARYING FRICTIONAL FORCES ON A FILM ADVANCING APPARATUS

RELATED APPLICATION

This application is related to my application Ser. No. 17,056 entitled "Film Advancing Apparatus", filed on even date herewith.

BACKGROUND OF THE INVENTION

1. Field of the Invention

This invention relates to apparatus for moving an exposed film unit from a film cassette and into engagement with a pair of pressure-applying rollers.

2. Description of the Prior Art

Photographic apparatus of the type having manually operative film advancing means for moving an exposed film unit into engagement with a pair of elongate rollers for subsequent processing are relatively well known. For example, U.S. Pat. No. 2,873,658 shows a camera having a manually actuatable film advancing member mounted for movement between first and second positions for moving an exposed film unit into the bite of a pair of processing rollers. A spring, connected to the film advancing member, is tensioned during the movement of the latter toward the second position and provides a force for returning the film advancing member to the first position. Obviously, if the spring is to perform its function, it must be strong enough to overcome the frictional force created between the film advancing member and its mounting structure during such return movement. Accordingly, it can be seen that if this frictional force could be substantially reduced, the spring could be replaced by a less powerful and therefore less inexpensive one.

U.S. Pat. No. 3,826,655 presents a situation similar to that of the U.S. Pat. No. 2,873,658 patent supra except here the film advancing member is motor driven in a manner which cants the film engaging portion of the member into alignment with a diverter bar attached to the leading edge of a film unit. However, there does not appear to be any reduction in the frictional force between the film advancing member and its mounting structure prior to its return to the first position.

U.S. Pat. No. 4,068,244 shows a camera having a manually actuatable film advancing member wherein the frictional force between it and a ratchet structure is substantially reduced prior to being returned to its original or first position. However, the ratchet structure is not a part of the mounting structure for the film advancing member and there does not appear to be any substantial reduction in the frictional forces acting therebetween prior to moving the film advancing member back to the first position.

SUMMARY OF THE INVENTION

The instant invention relates to photographic apparatus of the self developing type and more particularly to the frictional relationship between a film advancing member and its supporting structure. The photographic apparatus includes a film chamber for receiving a film cassette containing a plurality of individual film units of the self-developing type. A pair of juxtaposed, pressure applying, motor driven spread rollers are mounted adjacent one end of the film chamber and an elongate member formed from a single sheet of material, e.g., steel, is mounted along one side of the film chamber for reciprocal movement toward and away from the spread rollers. The elongate member includes three rearwardly directed cantilevered extensions and two forwardly directed cantilevered extensions. A first of the rearwardly directed extensions is constructed to extend into an ingress opening in the film cassette so as to engage an uppermost film unit by its trailing edge prior to moving it out of the film cassette via an egress opening. A second of the rearwardly directed extensions is constructed to close a normally open switch thereby enabling the motor to drive one of the spread rollers; and a third of the extensions is constructed to engage and index a film counter wheel. The two forwardly directed extensions have their free ends turned downwardly and are separated by a T-shaped slot.

The elongate member includes a pair of slots each of which is adapted to receive an upwardly extending pin. The free end of each pin is upset or otherwise provided with a head having a diameter greater than the width of the slot to thereby retain the pin within the slot. The length of each pin, as measured from its supporting structure to the underside of its head, is greater than the thickness of the elongate member thereby enabling the latter to either engage the undersides of the heads or the supporting structure of the pins during reciprocating movement of the elongate member.

After the uppermost film unit in the film cassette has been exposed, the user manually moves a slide button thereby moving the elongate member from its rest or first position forwardly to a second position. During the initial movement of the elongate member toward the second position, the downwardly turned ends of the forwardly directed extensions are cammed over a latching pin which extends transversely to the direction of travel of the elongate member. So located the pin cooperates with the downwardly turned ends to prevent, at this time, movement of the elongate member back into its rest or first position thereby insuring that the underlying film unit will not be moved out of the film cassette until the exposed film unit has been removed. As the movement of the elongate member continues toward the second position, the latching pin engages the underside of the two forwardly directed extensions and biases the elongate member upwardly into engagement with the underside of one of the heads on the pins. This biasing action substantially increases the sliding frictional forces acting between the elongate member and its supporting structure to thereby bring a downwardly turned end of the first extension into alignment with the trailing end of the exposed film unit. Further forward movement of the elongate member toward the second position brings the end of the first extension into engagement with the trailing edge of the exposed film unit and advances it toward the spread rollers via the egress opening in the film cassette. During this time, the end of the third extension indexes the rotatable film counter one position. As the leading edge of the exposed film unit is about to enter the bite of the spread rollers, the end of the second extension closes an electrical switch thereby causing the motor to drive one of the spread rollers. When the leading edge of the exposed film unit emerges from between the spread rollers it engages and closes a second electrical switch located in parallel with the first switch and in series with the motor thereby insuring continued operation of the motor until the exposed film unit moves out of engagement with the second switch. At substantially the same time that the second switch is closed by the leading edge of the exposed film, the head or horizontal portion of the T-shaped slot has been moved to a position immediately above the latching pin. So located, the previously upwardly biased elongate member inherently deflects downwardly thereby locating the latching pin above the two forwardly directed extensions while simultaneously substantially reducing the frictional forces between the elongate member and its supporting structure. Also, at this time, the pins have bottomed out at the ends of the slots and the elongate member is now in its second position. The user senses his inability to continue the movement of the elongate member past the second position and releases the slide button. The elongate member then moves back into the first position under the influence of a spring. The spring may be relatively weak since the frictional forces on the elongate member have been substantially reduced by reason of the latching pin no longer being in biasing engagement with the two forwardly directed extensions. The spread rollers continue the advancement of the exposed film unit from the film cassette and to the exterior of the apparatus while simultaneously rupturing a container of processing liquid attached to the leading end of the film unit and spreading its contents across the exposed photosensitive area of the film unit to initiate the formation of a visible image therein.

An object of the invention is to initially substantially increase the frictional forces acting between a film advancing member and its supporting structure so as to accurately locate a film engaging member in alignment with the trailing edge of an exposed film unit prior to moving the latter into engagement with a pair of processing rollers as the film advancing member moves from a first position to a second position.

Another object of the invention is to provide a film advancing member of the type described with means for substantially reducing the frictional forces acting between it and its supporting structure subsequent to the film advancing member reaching the second position whereby it may easily be returned to its original or first position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIGS. 3A-3C are perspective views depicting the relationship between one end of an elongate member and a latching pin as the elongate member moves between first and second positions; and FIGS. 4A-4C are side elevational views depicting the relationship of various elements of the camera as the elongate member moves from a first position to a second position.

DETAILED DESCRIPTION OF THE INVENTION

Figure 1:
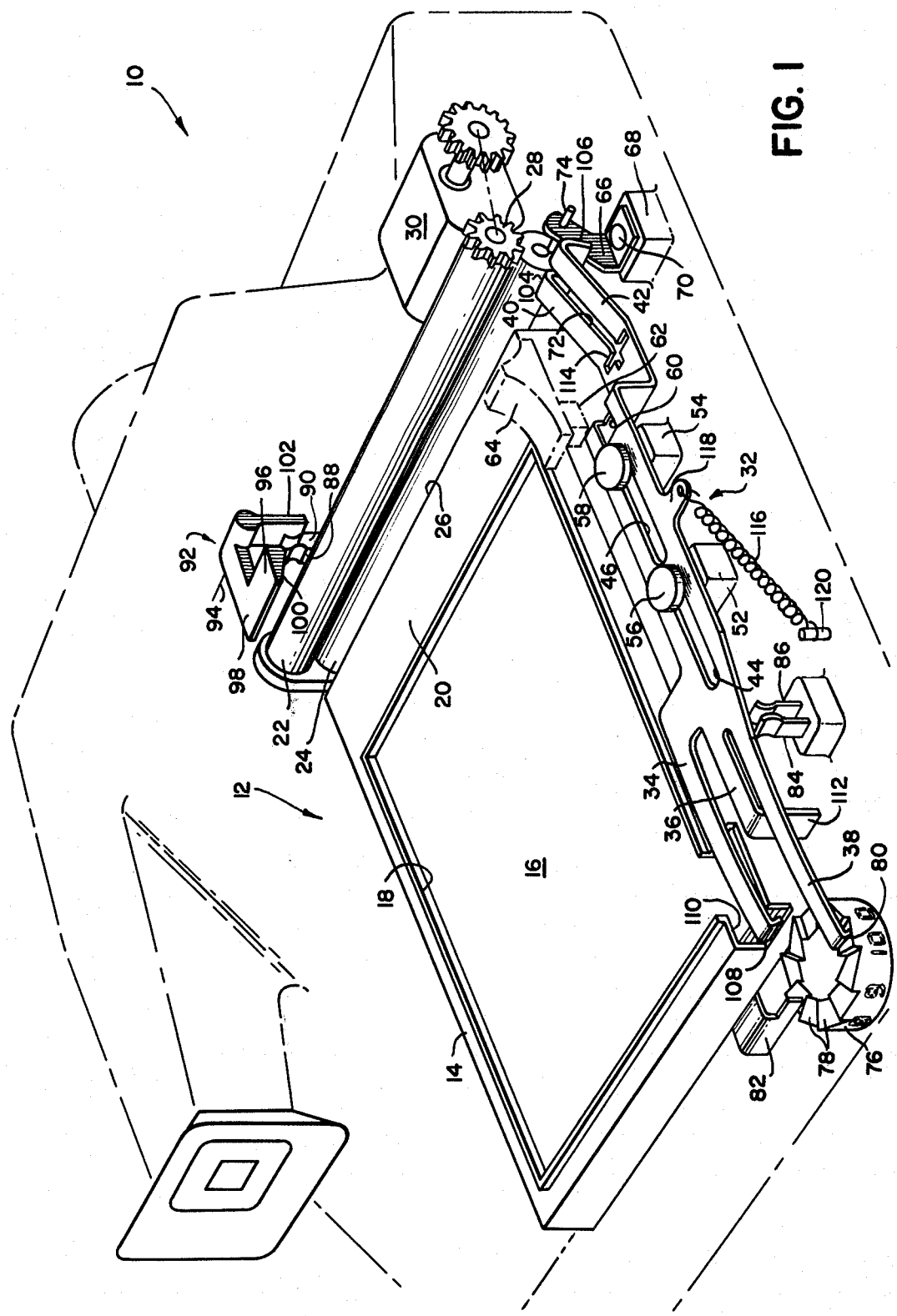
FIG. 1 is a perspective view of a camera which embodies the instant invention, the main camera housing being shown in phantom lines.

Reference is now made to FIG. 1 of the drawings wherein is shown photographic apparatus in the form of a camera 10. The camera 10 has the same general exterior configuration as that shown in U.S. Pat. No. 3,967,304 and includes a chamber 12 for supporting a film cassette 14 in position for the exposure of one of a plurality of thin self-developing type film units 16 through an exposure aperture 18 located in a forward wall 20 of the film cassette 12. A spread roller assembly including a pair of juxtaposed pressure applying rollers 22 and 24 is mounted adjacent one end of the film chamber 12 in position to receive therebetween an exposed film unit 16 as it exits from the film cassette 14 via an egress opening (not shown) located in a leading end wall 26 of the film cassette 14. A gear 28 is secured to one end of the roller 22 and is part of a gear train or transmission which extends between the roller 22 and a battery operated motor 30.

Figure 2:
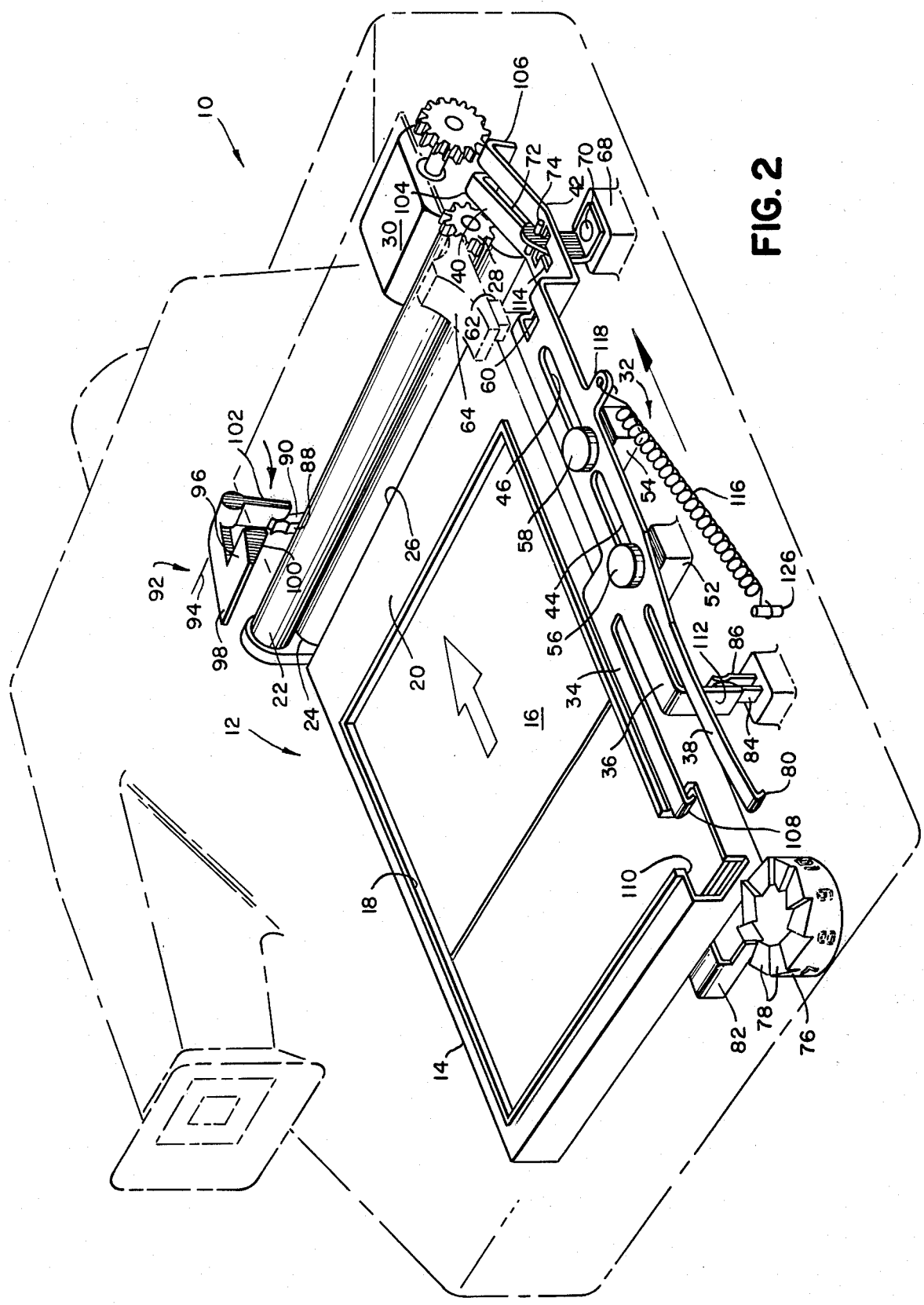
FIG. 2 is a perspective view similar to FIG. 1 showing the relationship between various elements of the camera near the end of a photographic cycle.

An elongate member 32 is mounted adjacent one side of the film chamber 12 for reciprocal movement between a first position, as shown in FIG. 1, and a second position, as shown in FIG. 2. The elongate member 32 includes first, second and third rearwardly directed extensions 34, 36 and 38, respectively, and a pair of forwardly directed extensions 40 and 42. A pair of slots 44 and 46 are located intermediate the ends of the elongate member 32 for receiving a pair of pins 48 and 50, respectively, extending upwardly from supporting blocks 52 and 54. Each of the pins 48 and 50 includes a head 56 and 58 having a diameter greater than the width of its respective slot to thereby capture the elongate member between the heads 56 and 58 and the supporting blocks 52 and 54. As best shown in FIGS. 4A-4C, each of the pins has a length, as measured from the top of each supporting block to the underside of each head, which is greater than the thickness of the elongate member 32. Extending forwardly of the slot 46 is a cutaway portion 60 which is adapted to slidably receive (in a vertical direction) the shank 62 of a manually operative button 64.

A flange 66 is suitably attached to a supporting block 68 by a rivet 70 such that the flange 66 is located in alignment with a T-shaped slot 72 located between the extensions 40 and 42. A pin 74 is fixedly mounted within the flange 66 such that it extends transversely to the direction of movement of the elongate member 32.

A film counter in the form of a rotatably mounted disc 76 having suitable indicia on its peripheral face for indicating the number of unexposed film units remaining in the film cassette is located adjacent a rear end of the film chamber 12. The upper face of the disc 76 is provided with a plurality of teeth 78. The disc 76 is adapted to be rotated in counterclockwise direction by the downwardly turned end 80 of the third extension 38. A downwardly biased pawl 82 is mounted in position to ride up the sloping surface of each tooth 78 during counterclock rotation of the disc 76 and then snap down behind the tooth to maintain the disc 76 in its indexed position. For example, in FIG. 1, the numeral "10" can be viewed through a window (not shown) in the camera housing thereby indicating that there are 10 unexposed film units in the film cassette 14. As the uppermost film unit 16 in the stack of film units is being removed from the film cassette 14, the disc 76 is indexed so as to present the numeral "9" to the window, as shown in FIG. 2.

A first normally open electrical switch means comprising a pair of resilient contacts 84 and 86 is mounted below the elongate member 32. When closed, the first switch connects a battery (preferably located within the film cassette 14) with the motor 30. A second normally open switch means is located on the outboard side of the rollers 22 and 24. The second switch means includes a pair of resilient contacts 88 and 90 which are located in a circuit in series with the battery and the motor 30 and in parallel with the first switch means. The second switch means also includes a bell crank 92 pivotally mounted about an axis 94. The bell crank is mounted beyond the far ends of the rollers 22 and 24, as viewed in FIG. 1, and therefore includes a member 96 which extends from an arm 98 inwardly to a position wherein it will be engaged by a film unit as it emerges from between the rollers. The member 96 includes an inclined surface 100 which when engaged by the leading edge of an emerging film unit pivots the bell crank 92 in a clockwise direction thereby causing the arm 102 of the bell crank 92 to move the contact 90 into engagement with the contact 88 thus connecting the motor 30 to the battery. The second switch means includes suitable means (not shown) for resiliently urging the bell crank 92 back into the position shown in FIG. 1 after the trailing end of the emerging film unit has moved out of engagement with the surface 100 of the member 96.

In the operation of the instant invention the various elements are located as shown in FIG. 1. After the uppermost film unit 16 has been exposed, the user manually grasps the button 64, which is slidably mounted within a track located in the main camera housing, and moves it forwardly in the direction of the rollers 22 and 24. This action results in the elongate member 32 moving out of the first position, shown in FIG. 1, and toward the second position, i.e., the position shown in FIG. 2. During the initial movement of the elongate member 32, the downwardly turned ends 104 and 106 of the extensions 40 and 42, respectively, are cammed over the latching pin 74 and snap back into the position shown in FIG. 3A. So positioned, the elongate member 32 cannot be returned to the first position until after the exposed film unit 16 has been moved to a position between the rollers 22 and 24. In other words, the latching engagement between the pin 74 and the downwardly turned ends 104 and 106 prevents the user from moving the elongate member 32 back to the first position and then toward the second position to thereby cause the end 108 to engage the trailing edge of the underlying unexposed film unit and move it out of the film cassette 14. Continued forward movement of the elongate member 32 results in the latching pin 74 engaging the bottom surfaces of the extensions 40 and 42, see FIG. 3B, and camming the elongate member 32 into a position wherein the upper surface of the elongate member 32 is in engagement with the underside of the head 58 and the lower surface of the elongate member 32 is in engagement with the upper surface of the supporting block 52. This biasing action greatly increases the frictional forces acting upon the elongate member while simultaneously lowering a downwardly turned end 108 of the first extension 34 into a position wherein it is in alignment with the trailing edge of the uppermost film unit 16 and an ingress opening 110 in the film cassette 14. Thus, increasing the frictional forces on the elongate member 32 provides for an improved means for accurately locating the end 108 relative to the trailing edge of the uppermost film unit 16 in the film cassette 14. The elongate member 32 is moved still further thereby bringing the end 108 into engagement with the trailing edge of the exposed film unit 16. As the end 108 moves the exposed film unit toward the bite of the rollers 22 and 24, the end of the third extension engages one of the teeth 78 on the disc 76 and rotates the latter in a counterclockwise direction until the numeral "9" is located in the position previously occupied by the numeral "10"; and a downwardly turned end 112 of the second extension 36 engages the electrical contact 84 and moves it into engagement with the contact 86 thereby closing the switch and connecting the motor 30 with the battery (not shown) so as to drive the roller 22. The closing of the switch occurs just prior to the leading edge of the exposed film unit moving into engagement with the rollers 22 and 24. As the leading edge of the exposed film unit 16 emerges from between the rollers 22 and 24 it engages the surface 100 of the bell crank 92 and rotates the bell crank 92 in a clockwise direction thereby causing the arm 102 to move the electrical contact 90 into engagement with the contact 88. With the contacts 88 and 90 in engagement, the second switch means couples the motor 30 with the battery thereby insuring continuous rotation of the roller 22 until the trailing end of the exposed film unit 16 has moved out of engagement with the rollers 22 and 24 and the inclined surface 100.

Immediately after the contacts 88 and 90 have been moved into engagement with each other, the head or transverse portion 114 of the slot 72 has moved to a position in alignment with the latching pin 74. So located, the previously upwardly biased extensions 40 and 42 inherently spring back to their original configuration as the latching pin 74 passes through the head portion 144 of the slot 72, as shown in FIGS. 3C and 4C. The elongate member 32 is now free to return to its first or original position under the influence of a spring 116 suitably attached to the elongate member 32 at 118 and to a stationary part of the camera at 120. It will be noted that when the extensions 40 and 42 return to their unstressed position, the frictional forces on the elongate member 32 are substantially eliminated except for those produced as the bottom surface of the elongate member 32 slides along the upper surfaces of the supporting blocks 52 and 54 and those produced as the latching pin 74 engages the apex of the extensions 40 and 42 and cams the latter downwardly just prior to the elongate member 32 reaching the first position. Accordingly, the spring 116 may be relatively weak. As the elongate member returns to its first position, the end 112 moves out of engagement with the electrical contact 84 thereby allowing the first switch means to assume its normally open condition. However, the motor 30 continues to drive the roller 22 because the second switch means including the contacts 88 and 90 maintains the electrical connection between the battery and the motor 30. The rollers 22 and 24 continue the advancement of the exposed film unit 16 toward the exterior of the camera while simultaneously rupturing a container of processing liquid mounted on the leading end of the film unit and spreading its contents across a photosensitive layer to initiate the formation of a visible image within the film unit.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for advancing a film unit of the self-developing type from an exposure plane to a position between a pair of pressure-applying rollers comprising:

means for supporting a film cassette in position to locate a film unit in an exposure plane; means in position to receive a leading end of the film unit therebetween as it is being advanced from the film cassette subsequent to exposure, said rollers being constructed to rupture a container of processing liquid attached to the leading end of the exposed film unit and spread its contents across the exposed photosensitive area of the film unit to initiate the formation of a visible image therein while simultaneously withdrawing the film unit from the film cassette;

an elongate member including film engaging means slidably mounted adjacent one side of said supporting means for reciprocating movement between first and second positions;

means for mounting said elongate member for reciprocating movement;

manually operative means for moving said elongate member from said first position to said second position; and means engageable by a section of said elongate member during the initial movement of said elongate member from said first position toward said second position for substantially increasing the sliding frictional force between said mounting means and said elongate member during said movement toward said second position while simultaneously moving said film engaging means into alignment with the trailing edge of the film unit located in the exposure plane prior to moving the film unit part way out of the film cassette and into engagement with said rollers.

2. Photographic apparatus as defined in claim 1 wherein said section of said elongate member includes a first portion and a second portion sloping upwardly from said first portion and terminating in a downwardly turned end which is adapted to be cammed over said engageable means during initial movement of said elongate member toward said second position and located therebehind to prevent movement of said elongate member back into said first position until said elongate member has entered said second position.

3. Photographic apparatus as defined in claim 2 wherein said engageable means comprises a pin extending transversely to the direction of travel of said elongate member toward said second position.

4. Photographic apparatus as defined in claim 3 wherein said first portion includes means defining a slot extending in a direction generally parallel to that of said pin, said slot being configured to allow the passage of said pin from the side of said elongate member facing in the direction of said downwardly turned end to the opposite side of said elongate member thereby substantially decreasing the sliding frictional force between said elongate member and said mounting means and permitting said elongate member to be returned to said first position.

5. Photographic apparatus as defined in claim 4 further including a third portion sloping upwardly from said first portion and terminating in a downwardly turned end which is adapted to be cammed over and located behind said pin during initial movement of said elongate member toward said second position, said second and third portions defining a slot therebetween which extends from said slot in said first portion to an open end at said downwardly turned ends of said second and third portions.

* * * * *